United States Patent [19]

Itzov et al.

[11] Patent Number: 4,655,649

[45] Date of Patent: Apr. 7, 1987

[54] DRILL PRESS SWITCH HANDLE

[75] Inventors: Andrew L. Itzov, Menomonee Falls; John C. Myers, Oconomowoc, both of Wis.

[73] Assignee: Milwaukee Electric Tool Corporation, Brookfield, Wis.

[21] Appl. No.: 904,869

[22] Filed: Sep. 9, 1986

Related U.S. Application Data

[63] Continuation of Ser. No. 717,958, Mar. 29, 1985, abandoned.

[51] Int. Cl.[4] .............................................. B23B 39/12

[52] U.S. Cl. .................................... 408/136; 200/157; 408/241 R; 408/712

[58] Field of Search ................. 408/135, 88, 136, 100, 408/712, 241 R, 236, 1 R; 200/157 R; 409/134, 131, 132

[56] References Cited

U.S. PATENT DOCUMENTS

| | | | |
|---|---|---|---|
| 2,672,770 | 3/1954 | Buck | 408/712 X |
| 2,879,678 | 3/1959 | Kaiser | 408/712 X |
| 2,882,761 | 4/1959 | Knosp et al. | 408/136 X |
| 3,837,757 | 9/1974 | Levine | 408/88 X |
| 4,540,319 | 9/1985 | Michiharu | 408/100 |

FOREIGN PATENT DOCUMENTS

| | | | |
|---|---|---|---|
| 775433 | 5/1957 | United Kingdom | 408/241 R |
| 1182169 | 2/1970 | United Kingdom | 408/136 |

*Primary Examiner*—Gil Weidenfeld
*Assistant Examiner*—Glenn L. Webb
*Attorney, Agent, or Firm*—Bayard H. Michael

[57] ABSTRACT

A power hand drill is clamped in the carriage which is slideably mounted on the vertical column. The lever arm is moved about a fixed pivot to control movement of the carriage. The lever arm is tubular and has a push rod extending from the handle into the interior of the housing to actuate a switch which, when closed, connects the power supply cord to a receptacle into which the drill power cord is plugged. The drill power switch is tied in the closed position. Therefore the user can control drill feed and operation with one hand.

4 Claims, 5 Drawing Figures

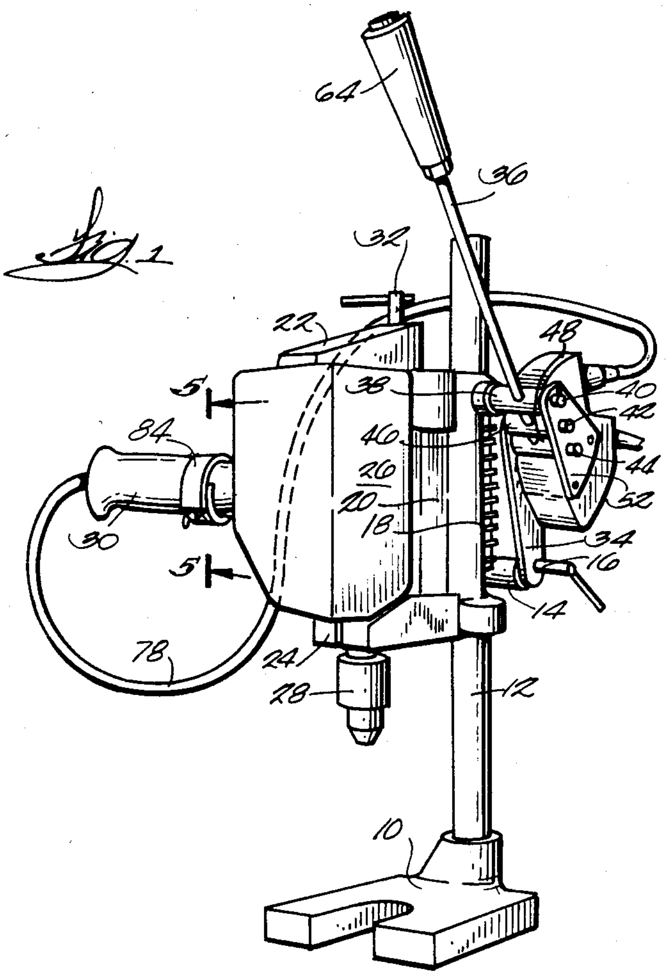
Fig. 1
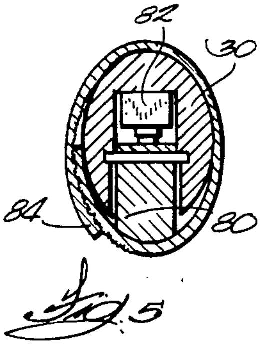
Fig. 5
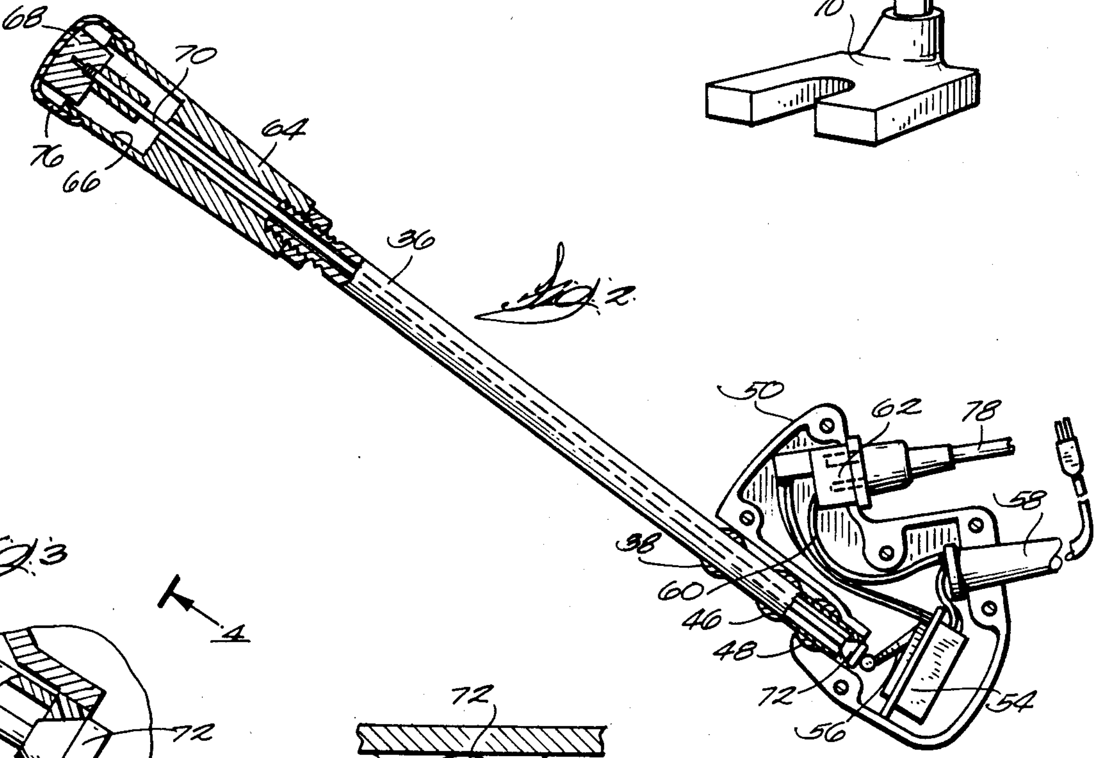
Fig. 2
Fig. 3
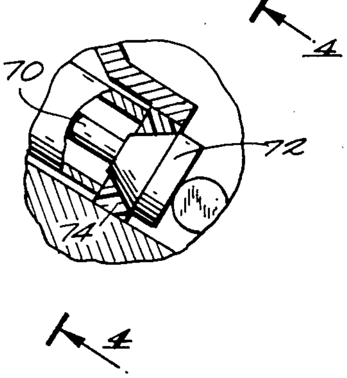
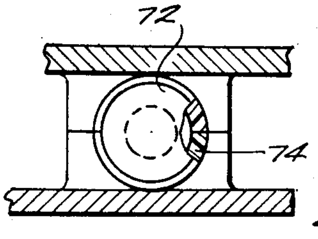
Fig. 4

DRILL PRESS SWITCH HANDLE

This is a continuation of co-pending application Ser. No. 717,958 filed on Mar. 29, 1985 now abandoned.

BACKGROUND OF THE INVENTION

This invention relates to drill stands and to the provision of an improved method of operating a drill in a drill stand. A drill stand is designed to accept a hand drill which is clamped in place. The stand is provided with a handle to control the feed of the drill bit into the work. To operate a drill stand the user closes the drill switch with one hand, and operates the handle witn the other.

This invention is directed to improving the operation of the drill by incorporating a power switch in the handle. The hand drill, which is clamped in the drill stand, is plugged into a power receptacle controlled by the switch. The power switch on the hand drill is held in the closed position. Now all the power supplied to the drill is controlled by the hand that controls the drill feed. This is a simpler operation for the user and provides an improved method of control.

SUMMARY OF THE INVENTION

This invention provides a drill stand having a feed handle incorporating a power switch controlling electric power supply to a receptacle into which the drill power cord is plugged. This enables the operator to control feed of the drill bit and drill operation with one hand.

BRIEF DESCRIPTION OF THE DRAWINGS

FIG. 1 is a perspective view of the drill stand with a drill clamped in position for operation.

FIG. 2 is a section through the length of the handle switch housing.

FIG. 3 is an enlarged detail of the inner end of the handle to show the saddle for the conical end of the actuator rod.

FIG. 4 is a section on line 4—4 in FIG. 3.

FIG. 5 is a section on line 5—5 of FIG. 1 showing how the trigger switch of the drill is strapped closed.

DETAILED DESCRIPTION OF THE DRAWINGS

The drill stand shown in FIG. 1 is provided with a base 10 supporting column 12 on which the drill support assembly is mounted. This includes a clamp 14 tightened and loosened by handle 16 to fix the vertical height of the assembly on the column. Spring 18 biases sliding carriage 20 upwardly. The carriage includes upper and lower clamps 22, 24 for securing a drill 26 in position to operate as a drill press with the drive spindle and chuck 28 vertically disposed and handle 30 projecting to one side. The upper clamp 22 is moved oy the handle 32 to clamp and release the drill.

It will be noted that the clamp 14 is provided with a plate or lever 34 which is provided with one or two pivot points about which the feed handle 36 can be pivoted. Handle 36 passes through tube 38 whicn is rotatable about an axis generally coincident with the axis of shaft 40. As the handle is pulled downwardly lever 36 pivots about a fixed pivot which may, for example, coincide with either pin 42 or 44 and will force the carriage and drill downwardly against the bias of the spring 18. Many details of this construction are not shown, but are not necessary to understand the present invention.

Lever 36 extends through sleeves 38, 46, 48 into split housing 50 secured to plate 52 to move with the handle as it pivots about its fixed pivot. The housing encloses a double pole, single throw switch 54 having a lever-type actuator 56 which is biased outwardly to the "off" position. The switch is of the "momentary-on" type, that is the lever 56 must be depressed to turn on or close the switch. It will be noted that two wires from the power cord 58 lead to the switch 54 while a ground wire connects to the ground connection 60 at receptable 62 for power cord 78. Two wires lead from the output of switch 54 to receptacle 62. Thus, the switch when closed will supply power from the line cord 58 to the receptacle 62.

The lever 36 is tubular and has a handle 64 threaded to the outer end of the lever. The outer end of the handle 64 has a receptacle 66 in which a switch actuating button 68 is reciprocally mounted, i.e., it is threadably connected to the push rod 70 which extends the length of the lever and has a conical member 72 threaded on its inner end. This provides an enlarged head to actuate the tip of the switch actuator lever 56. The lever 56 is, as noted above, biased outwardly and this bias is used to bias the push rod 70 outwardly. The outward travel of the push rod is limited by half seats 74, 74. One seat half is located on each half of the housing and the two seat halves 74, 74 cooperate to make a complete seat for the conical portion of member 72. This centers the rod and seals against dirt.

It will be appreciated that an operator can grip the handle 64 with his thumb over the push button 68 for convenient actuation. A sealing boot 76 over the tip of the handle may be used to seal against dirt. The power cord 78 from the drill is plugged into receptacle 62 and the plunger 80 in the drill handle 30 which actuates the drill power switch 82 is held in a depressed, switch closed, position by means of a strap 84. Operation of the drill is controlled witn one hand. The handle 36 controls the feed of the drill bit into the work while the plunger 68 is depressed to close switcn 54 to connect the drill to the power supply. This is an improvement compared to prior arrangements which did not allow the operator to actuate the drill switch and the drill feed with the same hand.

We claim:

1. A drill stand comprising, a generally vertical column, a carriage mounted on said column for vertical movement, clamp means on said carriage for releasably supporting a power hand drill with the drill bit substantially parallel to said column for releasably supporting a power han drill with the drill bit substantially parallel to said column the power hand drill having an electric power cord, a housing pivotally mounted on said carriage, a lever having an inner end connected to said housing and an outer end positioned for manual actuation to pivot said housing relative to said carriage and relative to said column to move said carriage on said column, an electric power cord connected directly to said housing and having a plug for connection to a power supply, a switch in said housing and having its input connected to said power cord, an electric power receptacle mounted in said housing to enable the power cord of a power hand drill to be plugged into the receptable, said switch having an output connected to said receptacle and said switch being operative when closed to connect said power supply to said receptable and to a power drill plugged into the receptacle, said switch including a switch actuator biased in the direction in which said switch is open, and a plunger having approximately the same length as said lever and mounted for movement with said lever and movable inwardly lengthwise of said lever against the bias of said actuator to move said actuator to close said switch with the same hand as used in actuating said outer end of said lever, the bias of said actuator being operative to move said plunger outwardly and to open said switch when manual pressure is removed from the plunger.

2. The combination of claim 1 in which said lever is hollow and said plunger is coaxial with and reciprocally mounted in said lever, said lever terminating on the interior of said housing and said plunger being positioned to engage said switch actuator.

3. The combination of claim 2 and including means in said housing guiding the inner end of said plunger and limiting outward movement of said plunger, and means at the outer end of said lever to guide said plunger.

4. The method of using the structure set forth in claim 1 to operate a power hand drill of the type having an electric power cord and a switch operable when closed to energize the drill, comprising the steps of securing said drill to said carriage by said clamp means with the drill vertically disposed, connecting said drill power cord to said receptable, fixing said drill switch in closed position, and controlling the feed of said drill towards the work with said lever while at the same time controlling the operation of said drill by actuation of said plunger.

* * * * *

UNITED STATES PATENT AND TRADEMARK OFFICE
CERTIFICATE OF CORRECTION

PATENT NO. : 4,655,649

DATED : April 7, 1987

INVENTOR(S) : Itzov, et al.

It is certified that error appears in the above-identified patent and that said Letters Patent is hereby corrected as shown below:

Column 1, line 14, the word "witn" should read -- with --.

Column 1, line 38, before the words "switch housing" insert -- and --.

Column 1, line 57, the word "oy" should read -- by --.

Column 2, line 41, the word "witn" should read -- with --.

Column 2, line 43, the word "switcn" should read -- switch --.

Column 2, lines 54-56, delete "for releasably supporting a power han drill with the drill bit substantially parallel to said column" as that is a repeat of lines 52-54.

Signed and Sealed this

Twenty-seventh Day of October, 1987

*Attest:*

DONALD J. QUIGG

*Attesting Officer*

*Commissioner of Patents and Trademarks*